United States Patent
Xu et al.

(10) Patent No.: US 12,470,130 B2
(45) Date of Patent: Nov. 11, 2025

(54) CONTROL CIRCUIT FOR REDUCING ELECTROMAGNETIC RADIATION AND CONTROL METHOD THEREOF, AND ISOLATED POWER SUPPLY SYSTEM

(71) Applicant: HEFEI CLT MICROELECTRONICS CO. LTD, Anhui (CN)

(72) Inventors: Weiwei Xu, Anhui (CN); Yuanjun Zhu, Anhui (CN)

(73) Assignee: HEFEI CLT MICROELECTRONICS CO. LTD, Anhui (CN)

( * ) Notice: Subject to any disclaimer, the term of this patent is extended or adjusted under 35 U.S.C. 154(b) by 0 days.

(21) Appl. No.: 18/574,561

(22) PCT Filed: Aug. 15, 2023

(86) PCT No.: PCT/CN2023/113101
§ 371 (c)(1),
(2) Date: Dec. 27, 2023

(87) PCT Pub. No.: WO2024/187674
PCT Pub. Date: Sep. 19, 2024

(65) Prior Publication Data
US 2025/0096672 A1 Mar. 20, 2025

(30) Foreign Application Priority Data
Mar. 14, 2023 (CN) .......................... 202310257225.4

(51) Int. Cl.
*H02M 1/44* (2007.01)
*H02M 1/08* (2006.01)
(Continued)

(52) U.S. Cl.
CPC ............. *H02M 1/44* (2013.01); *H02M 1/081* (2013.01); *H02M 1/088* (2013.01); *H02M 1/123* (2021.05);
(Continued)

(58) Field of Classification Search
CPC ........ H02M 1/44; H02M 1/081; H02M 1/088; H02M 1/123; H02M 3/33573; H02M 3/33592; H03L 7/089; Y02B 70/10
See application file for complete search history.

(56) References Cited

U.S. PATENT DOCUMENTS 4,629,914 A * 12/1986 Okanobu ................ H03L 7/191
327/5
4,672,528 A * 6/1987 Park ..................... H02M 3/3376
363/17
(Continued)

FOREIGN PATENT DOCUMENTS

CN 103929045 A 7/2014
CN 104113332 A 10/2014
(Continued)

OTHER PUBLICATIONS

He, X. et al., "Some problems of phase lock and synchronism technique in application to UPS," Telecommunication Engineering, vol. 29, No. 1, Feb. 28, 1989, 6 pages.
(Continued)

*Primary Examiner* — Yusef A Ahmed
(74) *Attorney, Agent, or Firm* — McCoy Russell LLP

(57) ABSTRACT

Control circuits for reducing electromagnetic radiation and control methods thereof, and isolated power supply systems are disclosed. The control circuit includes: an inverter circuit, a first adaptive control circuit, a first oscillation circuit and a first driving circuit, the inverter circuit outputs a first voltage signal and a second voltage signal; the first oscillation circuit generates and outputs a first oscillation signal, a first sampling end of the first adaptive control circuit couples to the first voltage signal, a second sampling end of the first adaptive control circuit couples to the second voltage signal, an input end of the first adaptive control circuit connects with an output end of the first oscillation circuit, an output
(Continued)

end of the first adaptive control circuit connects with an input end of the first driving circuit, and an output end of the first driving circuit connects with a control end of the inverter circuit.

10 Claims, 5 Drawing Sheets

(51) Int. Cl.
  *H02M 1/088* (2006.01)
  *H02M 1/12* (2006.01)
  *H02M 3/335* (2006.01)
(52) U.S. Cl.
  CPC ... *H02M 3/33573* (2021.05); *H02M 3/33592* (2013.01)

(56) References Cited

U.S. PATENT DOCUMENTS

| | | | | | |
|---|---|---|---|---|---|
| 5,099,186 | A | * | 3/1992 | Rippel | B60L 3/003 318/803 |
| 5,646,835 | A | * | 7/1997 | Katcha | H02M 3/33573 324/322 |
| 6,021,058 | A | * | 2/2000 | Yasohara | H02M 7/538 363/32 |
| 6,897,698 | B1 | * | 5/2005 | Gheorghiu | H02M 3/33571 327/257 |
| 6,975,698 | B2 | * | 12/2005 | Katcha | A61B 6/56 378/107 |
| 9,287,795 | B2 | * | 3/2016 | Ma | H02M 3/3388 |
| 9,322,890 | B2 | * | 4/2016 | Xu | G01R 33/3852 |
| 9,425,700 | B2 | * | 8/2016 | Lu | H02M 3/3376 |
| 9,450,496 | B2 | * | 9/2016 | Sigamani | H02M 3/3376 |
| 10,658,937 | B1 | * | 5/2020 | Zafarana | H02M 1/083 |
| 2005/0219863 | A1 | * | 10/2005 | Fukumoto | H02M 7/53871 363/16 |
| 2005/0231988 | A1 | * | 10/2005 | Chi | H02M 7/53875 363/98 |
| 2006/0138973 | A1 | * | 6/2006 | Hirosawa | H02M 3/33576 363/21.01 |
| 2012/0201064 | A1 | * | 8/2012 | Asakura | H02M 3/155 363/98 |
| 2014/0307483 | A1 | * | 10/2014 | Sigamani | H02M 1/4225 363/21.04 |
| 2016/0181925 | A1 | * | 6/2016 | Chiang | H02M 3/33584 363/17 |
| 2018/0287479 | A1 | * | 10/2018 | Li | H02M 3/33523 |
| 2019/0044434 | A1 | * | 2/2019 | Elferich | H02M 3/01 |
| 2019/0058393 | A1 | * | 2/2019 | Elferich | H05B 45/39 |
| 2020/0287460 | A1 | * | 9/2020 | Samizo | H05B 45/3725 |
| 2022/0393604 | A1 | * | 12/2022 | Mazurek | H02M 1/0058 |
| 2022/0416531 | A1 | * | 12/2022 | Zhao | H02H 3/093 |
| 2024/0313658 | A1 | * | 9/2024 | Bernardon | H02M 1/0012 |

FOREIGN PATENT DOCUMENTS

| | | |
|---|---|---|
| CN | 105226984 A | 1/2016 |
| CN | 111010167 A | 4/2020 |
| CN | 112234858 A | 1/2021 |
| CN | 112968608 A | 6/2021 |
| CN | 113258813 A | 8/2021 |
| CN | 115987083 A | 4/2023 |
| JP | 2009268277 A | 11/2009 |
| JP | 2011239226 A | 11/2011 |

OTHER PUBLICATIONS

Zhu, C. et al., "Collaborative Control Strategy of MIti-DC System for Offshore Islands," Electric Power Construction, vol. 39, No. 2, Feb. 1, 2018, 9 pages.

State Intellectual Property Office of the People's Republic of China, Office Action and Search Report Issued in Application No. 202310257225.4, Apr. 26, 2023, 17 pages. (Submitted with Machine/ Partial Translation).

State Intellectual Property Office of the People's Republic of China, Notice of Allowance Issued in Application No. 202310257225.4, May 18, 2023, 6 pages. (Submitted with Machine/Partial Translation).

ISA State Intellectual Property Office of the People's Republic of China, International Search Report Issued in Application No. PCT/ CN2023/113101, Nov. 22, 2023, WIPO, 3 pages.

ISA State Intellectual Property Office of the People's Republic of China, Written Opinion of the International Searching Authority Issued in Application No. PCT/CN2023/113101, Nov. 22, 2023, WIPO, 6 pages.(Submitted with Machine/Partial Translation).

* cited by examiner

CONTROL CIRCUIT FOR REDUCING ELECTROMAGNETIC RADIATION AND CONTROL METHOD THEREOF, AND ISOLATED POWER SUPPLY SYSTEM

CROSS REFERENCE TO RELATED APPLICATION

The present application is a U.S. National Stage of International Application No. PCT/CN2023/113101, filed on Aug. 15, 2023, which claims the benefit of priority to Chinese Application No. 202310257225.4, filed on Mar. 14, 2023, the contents of all of which are incorporated by reference herein in their entireties for all purposes.

TECHNICAL FIELD

The present disclosure relates to the field of isolated power supply technologies, and in particular to control circuits for reducing electromagnetic radiation and control methods thereof, and isolated power supply systems.

BACKGROUND

An isolated power supply separates inputs and outputs of a system, allowing power and data to be transferred through isolation barriers rather than direct electrical connections. This is very important to ensure safety and reliability of the system in harsh industrial environments (such as electric vehicles, communication systems, medical equipment, etc.).

The isolated power supply includes an inverter circuit and a transformer, which can convert direct current (DC) into alternating current (AC) and then into DC. The inverter circuit is generally a full-bridge circuit, including two pairs of transistors, and an inverter process is carried out by alternately turning on and off the two pairs of transistors. Electromagnetic radiation/emission in the isolated power supply includes edge radiation and dipole radiation. The edge radiation is generated by a current loop between power supply and ground on primary and secondary sides of the transformer, which can be reduced by decoupling capacitors and magnetic beads, while the dipole radiation is a difficult problem to eliminate in the isolated power supply.

In a full-bridge circuit, the same pair of transistors may be turned on or off asymmetrically due to variation in their manufacturing processes, which leads to a large common-mode voltage between the primary side and the secondary side of the transformer. The common-mode voltage variation generates a large common-mode current through distributed parasitic capacitance between the primary side and the secondary side of the transformer, and the common-mode current generates dipole radiation through the inverter circuit and the transformer. Therefore, the asymmetry (non-synchronization) of the turn-on or turn-off of a pair of transistors in the inverter circuit leads to large dipole emissions of the inverter circuit, which in turn leads to large electromagnetic emissions, which easily interferes with other components.

SUMMARY

The present disclosure provides control circuits for reducing electromagnetic radiation and control methods thereof, as well as isolated power supply systems, so as to reduce the common-mode voltage variation of a circuit and further reduce the electromagnetic radiation of the circuit.

According to an aspect of the present disclosure, a control circuit for reducing electromagnetic radiation is provided, including: an inverter circuit, a first adaptive control circuit, a first oscillation circuit and a first driving circuit; where a first output end of the inverter circuit is configured to output a first voltage signal, and a second output end of the inverter circuit is configured to output a second voltage signal;

the first oscillation circuit is configured to generate and output a first oscillation signal;

a first sampling end of the first adaptive control circuit couples to the first voltage signal, a second sampling end of the first adaptive control circuit couples to the second voltage signal, an input end of the first adaptive control circuit is electrically connected with an output end of the first oscillation circuit, and an output end of the first adaptive control circuit is electrically connected with an input end of the first driving circuit, and the first adaptive control circuit is configured to generate a first phase control signal according to the first oscillation signal and a phase difference between the first voltage signal and the second voltage signal;

an output end of the first driving circuit is electrically connected with a control end of the inverter circuit, and the first driving circuit is configured to adjust an output of the inverter circuit according to the first phase control signal, so that phase difference between the first voltage signal and the second voltage signal is less than a first preset threshold.

In some examples, the inverter circuit includes a first transistor, a second transistor, a third transistor and a fourth transistor, where a first electrode of the first transistor is electrically connected with a DC power supply, and a second electrode of the first transistor is electrically connected with a first electrode of the second transistor, and the second electrode of the first transistor serves as the first output end of the inverter circuit, a second electrode of the second transistor is grounded, a first electrode of the third transistor is electrically connected with the first electrode of the first transistor, a second electrode of the third transistor is electrically connected with a first electrode of the fourth transistor, the second electrode of the third transistor serves as the second output end of the inverter circuit, and a second electrode of the fourth transistor is grounded, the control end of the inverter circuit includes a first control end, a second control end, a third control end and a fourth control end, where a third electrode of the first transistor serves as the first control end, a third electrode of the second transistor serves as the second control end, a third electrode of the third transistor serves as the third control end, and a third electrode of the fourth transistor serves as the fourth control end;

the output end of the first driving circuit includes a first driving output end, a second driving output end, a third driving output end and a fourth driving output end, where the first driving output end is electrically connected with the first control end of the inverter circuit, the second driving output end is electrically connected with the second control end of the inverter circuit, the third driving output end is electrically connected with the third control end of the inverter circuit, and the fourth driving output end is electrically connected with the inverter circuit.

In some examples, the first phase control signal includes a first control signal and a second control signal, an output end of the first adaptive control circuit includes a first output end and a second output end, the first output end of the first adaptive control circuit is configured to output the first control signal and the second output end of the first adaptive control circuit is configured to output the second control signal;

the first driving circuit includes a first driving sub-circuit and a second driving sub-circuit, where a first output end of the first driving sub-circuit serves as the first driving output end, a second output end of the first driving sub-circuit serves as the third driving output end, a first output end of the second driving sub-circuit serves as the second driving output end, and a second output end of the second driving sub-circuit serves as the fourth driving output end, an input end of the first driving sub-circuit couples to the first control signal, and an input end of the second driving sub-circuit couples to the second control signal.

In some examples, the first adaptive control circuit includes a phase detector, a charge pump and a voltage control delay line, a first input end of the phase detector couples to the first voltage signal, a second input end of the phase detector couples to the second voltage signal, and the phase detector is configured to generate a first timing control signal and a second timing control signal according to the phase difference between the first voltage signal and the second voltage signal;

a first input end of the charge pump couples to the first timing control signal, a second input end of the charge pump couples to the second timing control signal, and the charge pump is configured to generate a voltage-controlled control voltage according to the first timing control signal and the second timing control signal;

an input end of the voltage control delay line is electrically connected with an output end of the charge pump, the input end of the voltage control delay line is further electrically connected with the output end of the first oscillation circuit, a first output end of the voltage control delay line serves as a first output end of the first adaptive control circuit, a second output end of the voltage control delay line serves as a second output end of the first adaptive control circuit, and the voltage control delay line is configured to generate the first phase control signal according to the voltage-controlled control voltage and the first oscillation signal.

In some examples, the phase detector includes a first flip-flop, a second flip-flop with a same structure as the first flip-flop, and a NAND gate;

the first input end of the phase detector is electrically connected with a clock end of the first flip-flop, the second input end of the phase detector is electrically connected with a clock end of the second flip-flop, data input ends of the two flip-flops are electrically connected with the DC power supply, reset ends of the two flip-flops are electrically connected with an output end of the NAND gate, and an output end of the first flip-flop outputs the first timing control signal, and an output end of the second flip-flop outputs the second timing control signal; and two input ends of the NAND gate are electrically connected with the first timing control signal and the second timing control signal, respectively.

In some examples, the charge pump includes a first power supply, a first switch, a second switch, a second power supply, and a storage capacitor, the first power supply, the first switch, the second switch and the second power supply are sequentially connected in series between the DC power supply and a ground;

a control end of the first switch is connected to the first timing control signal, and in a case that the first timing control signal is at a first voltage level, the first switch is closed, and in a case that the first timing control signal is at a second voltage level, the first switch is opened;

a control end of the second switch is connected to the second timing control signal, and in a case that the second timing control signal is at the first voltage level, the second switch is closed, and in a case that the second timing control signal is at the second voltage level, the second switch is opened;

a common end of the first switch and the second switch serves as an output end of the charge pump to output the voltage-controlled control voltage;

a first end of the storage capacitor is connected to the common end, and a second end of the storage capacitor is connected to the ground, and the storage capacitor is charged or discharged according to states of the first switch and the second switch.

In some examples, the first adaptive control circuit further includes a filter circuit, an input end of the filtering circuit is electrically connected with an output end of the charge pump, and an output end of the filtering circuit is electrically connected with the input end of the voltage control delay line.

According to another aspect of the present disclosure, an isolated power supply system is provided, including a transformer, a rectifier circuit and the above-mentioned control circuit for reducing electromagnetic radiation, where a first input end of the transformer couples to the first voltage signal, and a second input end of the transformer couples to the second voltage signal, and an output end of the transformer is electrically connected with an input end of the rectifier circuit, and an output end of the rectifier circuit is electrically connected with a load.

In some examples, the isolated power supply system further includes a feedback circuit, where an input end of the feedback circuit is electrically connected with the output end of the rectifier circuit, and an output end of the feedback circuit is electrically connected with an input end of the first oscillation circuit, and the feedback circuit is configured to control a frequency of the first oscillation signal output by the first oscillation circuit according to a voltage output by the output end of the rectifier circuit and an expected voltage, so that a difference between the voltage output by the output end of the rectifier circuit and the expected voltage is less than a threshold voltage.

In some examples, the output end of the transformer includes a first output end and a second output end, the rectifier circuit is a full-bridge rectifier circuit, and the isolated power supply system further includes a second adaptive control circuit, a second driving circuit and a second oscillation circuit;

a first input end of the rectifier circuit is electrically connected with the first output end of the transformer, the first output end of the transformer is configured to output a third voltage signal, a second input end of the rectifier circuit is electrically connected with the second output end of the transformer, and the second output end of the transformer is configured to output a fourth voltage signal;

the second oscillation circuit is configured to generate and output a second oscillation signal;

a first sampling end of the second adaptive control circuit couples to the third voltage signal, a second sampling end of the second adaptive control circuit couples to the fourth voltage signal, an input end of the second adaptive control circuit is electrically connected with an output end of the second oscillation circuit, and an output end of the second adaptive control circuit is electrically connected with an input end of the second driving circuit, and the second adaptive control circuit is configured to generate a second phase control signal according to the second oscillation signal and a phase difference between the third voltage signal and the fourth voltage signal;

an output end of the second driving circuit is electrically connected with a control end of the rectifier circuit, and the second driving circuit is configured to adjust an output of the rectifier circuit according to the second phase control signal, so that the phase difference between the third voltage signal and the fourth voltage signal is less than a second preset threshold.

According to another aspect of the present disclosure, a control method of a control circuit for reducing electromagnetic radiation is provided, where the control circuit for reducing electromagnetic radiation includes: an inverter circuit, a first adaptive control circuit, a first oscillation circuit and a first driving circuit, a first output end of the inverter circuit is configured to output a first voltage signal, and a second output end of the inverter circuit is configured to output a second voltage signal; the first oscillation circuit is configured to generate and output a first oscillation signal, a first sampling end of the first adaptive control circuit couples to the first voltage signal, a second sampling end of the first adaptive control circuit couples to the second voltage signal, an input end of the first adaptive control circuit is electrically connected with an output end of the first oscillation circuit, an output end of the first adaptive control circuit is electrically connected with an input end of the first driving circuit, and an output end of the first driving circuit is electrically connected with a control end of the inverter circuit;

the control method includes:
generating, by the first oscillation circuit, a first oscillation signal;
generating, by the first adaptive control circuit, a first phase control signal according to the first oscillation signal and a phase difference between the first voltage signal and the second voltage signal;
adjusting, by the first driving circuit, an output of the inverter circuit according to the first phase control signal, so that the phase difference between of the first voltage signal and the second voltage signal is less than a first preset threshold.

In some examples, where the inverter circuit includes a first transistor, a second transistor, a third transistor and a fourth transistor, where a first electrode of the first transistor is electrically connected with a DC power supply, and a second electrode of the first transistor is electrically connected with a first electrode of the second transistor, and the second electrode of the first transistor serves as the first output end of the inverter circuit, a second electrode of the second transistor is grounded, a first electrode of the third transistor is electrically connected with the first electrode of the first transistor, a second electrode of the third transistor is electrically connected with a first electrode of the fourth transistor, the second electrode of the third transistor serves as the second output end of the inverter circuit, and a second electrode of the fourth transistor is grounded, the control end of the inverter circuit includes a first control end, a second control end, a third control end and a fourth control end, where a third electrode of the first transistor serves as the first control end, a third electrode of the second transistor serves as the second control end, a third electrode of the third transistor serves as the third control end, and a third electrode of the fourth transistor serves as the fourth control end; the output end of the first driving circuit includes a first driving output end, a second driving output end, a third driving output end and a fourth driving output end, where the first driving output end is electrically connected with the first control end of the inverter circuit, the second driving output end is electrically connected with the second control end of the inverter circuit, the third driving output end is electrically connected with the third control end of the inverter circuit, and the fourth driving output end is electrically connected with the inverter circuit.

In some examples, adjusting, by the first driving circuit, the output of the inverter circuit according to the first phase control signal, so that the phase difference between the first voltage signal and the second voltage signal is less than the first preset threshold includes:

in a case that a phase of the second voltage signal is ahead of a phase of the first voltage signal, controlling, according to the first phase control signal, a time that the fourth control end of the inverter circuit receives a signal transition edge to be delayed, or a time that the first control end of the inverter circuit receives the signal transition edge to be advanced;

in a case that the phase of the second voltage signal is ahead of the phase of the first voltage signal, controlling, according to the first phase control signal, a time that the second control end of the inverter circuit receives the signal transition edge to be delayed, or a time that the third control end of the inverter circuit receives the signal transition edge to be advanced.

In some examples, adjusting, by the first driving circuit, the output of the inverter circuit according to the first phase control signal, so that the phase difference between the first voltage signal and the second voltage signal is less than the first preset threshold includes:

in a case that a phase of the second voltage signal is behind a phase of the first voltage signal, controlling, according to the first phase control signal, a time that the fourth control end of the inverter circuit receives a signal transition edge to be advanced, or a time that the first control end of the inverter circuit receives the signal transition edge to be delayed;

in a case that the phase of the second voltage signal is behind the phase of the first voltage signal, controlling, according to the first phase control signal, a time that the second control end of the inverter circuit receives the signal transition edge to be advanced, or a time that the third control end of the inverter circuit receives the signal transition edge to be delayed.

The control circuit for reducing electromagnetic radiation provided by the embodiments of the present disclosure includes: an inverter circuit, a first adaptive control circuit, a first oscillation circuit and a first driving circuit, the inverter circuit is configured to output a first voltage signal and a second voltage signal; the first oscillation circuit is configured to generate and output a first oscillation signal, a first sampling end of the first adaptive control circuit couples to the first voltage signal, a second sampling end of the first adaptive control circuit couples to the second voltage signal, an input end of the first adaptive control circuit is electrically connected with an output end of the first oscillation circuit, an output end of the first adaptive control circuit is electrically connected with an input end of the first driving circuit, and an output end of the first driving circuit is electrically connected with a control end of the inverter circuit. The greater the phase difference between the first voltage signal and the second voltage signal, the greater the common-mode voltage variation of the inverter circuit, resulting in greater electromagnetic radiation. The first adaptive control circuit generates a first phase control signal according to the phase difference between the first voltage signal and the second voltage signal, so that the first driving circuit adjusts the output of the inverter circuit according to the first phase control signal, and finally the phases of the first voltage signal and the second voltage signal are the same. By adjusting the output of the inverter circuit through the first adaptive control circuit, the phases of the first voltage signal and the second voltage signal are the same, reducing the magnitude of the common-mode voltage variation and thereby reducing the electromagnetic radiation of the control circuit.

It should be understood that the content described in this section is not intended to identify key or important features of the embodiments of the present disclosure, nor is it used to limit the scope of the present disclosure. Other features of the present disclosure will be readily understood from the following description.

BRIEF DESCRIPTION OF DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from these accompanying drawings without inventive efforts.

DETAILED DESCRIPTION

To make a person skilled in the art better understand technical solutions of the embodiments of the present disclosure, the technical solutions in the embodiments of the present disclosure will be clearly and completely described below with reference to the accompanying drawings in the embodiments of the present disclosure. Apparently, the embodiments described are merely some embodiments of the present disclosure, and not all embodiments. All other embodiments obtained by a person of ordinary skill in the art based on the embodiments of the present disclosure without creative efforts shall fall within the protection scope of the present disclosure.

It should be noted that, the terms "first", "second," etc. in the description and claims of the present disclosure and the above accompanying drawings are used to distinguish similar objects, and are not used to describe a particular order or sequence. It should be understood that the data so used can be interchanged under appropriate circumstances, so that the embodiments of the present disclosure described herein can be implemented in an order other than those illustrated or described herein. In addition, the terms "including", "containing" and any variations thereof are intended to cover a non-exclusive inclusion, for example, a process, a method, a system, a product or a device that includes a series of steps or units is not necessarily limited to those explicitly listed, but may include other steps or units that are not clearly listed or are inherent to the process, method, product or device.

Figure 1:
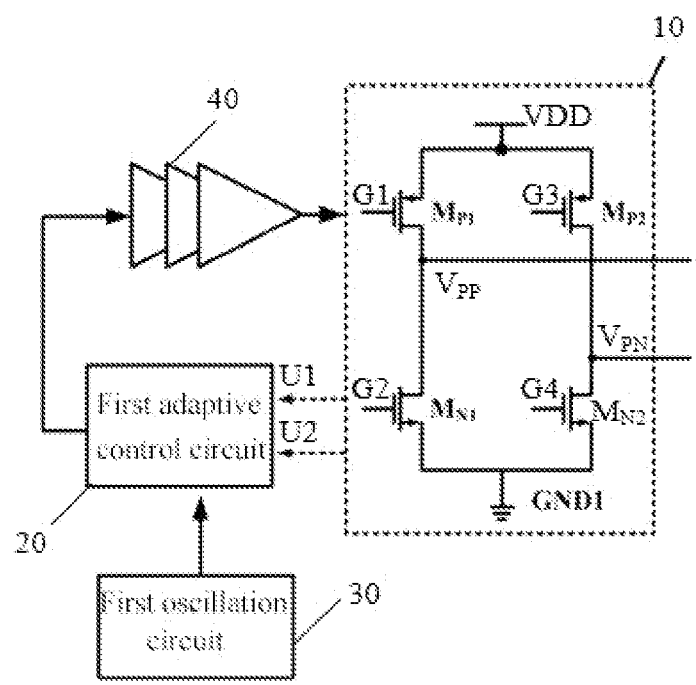
FIG. 1 is a schematic structural diagram of a control circuit for reducing electromagnetic radiation according to an embodiment of the present disclosure.

FIG. 1 is a schematic structural diagram of a control circuit for reducing electromagnetic radiation according to an embodiment of the present disclosure. Referring to FIG. 1, the control circuit for reducing electromagnetic radiation includes an inverter circuit 10, a first adaptive control circuit 20, a first oscillation circuit 30 and a first driving circuit 40.

A first output end $V_{PP}$ of the inverter circuit 10 is configured to output a first voltage signal U1, and a second output end $V_{PN}$ of the inverter circuit 10 is configured to output a second voltage signal U2.

The first oscillation circuit 30 is configured to generate and output a first oscillation signal.

A first sampling end of the first adaptive control circuit 20 couples to the first voltage signal U1, a second sampling end of the first adaptive control circuit 20 couples to the second voltage signal U2, an input end of the first adaptive control circuit 20 is electrically connected with an output end of the first oscillation circuit 30, and an output end of the first adaptive control circuit 20 is electrically connected with an input end of the first driving circuit 40. The first adaptive control circuit 20 is configured to generate a first phase control signal according to the first oscillation signal and a phase difference between the first voltage signal U1 and the second voltage signal U2.

An output end of the first driving circuit 40 is electrically connected with a control end of the inverter circuit 10, and the first driving circuit 40 is configured to adjust an output of the inverter circuit 10 according to the first phase control signal, so that phases of the first voltage signal U1 and the second voltage signal U2 are the same.

In some examples, the inverter circuit 10 in this embodiment may be a full-bridge circuit, and the inverter circuit 10 is connected to a DC power supply VDD to convert a DC voltage provided by the DC power supply VDD into an AC voltage output via its own first output end $V_{PP}$ and second output end $V_{PN}$. The first driving circuit 40 is configured to receive the first phase control signal related to the first oscillation signal, generate a signal with driving ability after multi-stage driving and transmit it to the control end of the inverter circuit 10.

When the inverter circuit 10 is applied to an isolated power supply, the first output end $V_{PP}$ and the second output end $V_{PN}$ of the inverter circuit 10 are electrically connected with the transformer. Under normal circumstances, the phases of voltages output by the first output end $V_{PP}$ and the second output end $V_{PN}$ of the inverter circuit 10 are the same, that is, the phase difference between them is equal to zero, and a common-mode voltage variation is the smallest at this time, which is equal to Vd/2, where Vd is a voltage value of the DC power supply VDD. Due to the fact that the inverter circuit 10 may include multiple transistors, and two transistors that should have been turned on or off simultaneously cannot be turned on or off synchronously due to their different manufacturing processes and other factors, there is a phase difference between the voltages output from the first output end $V_{PP}$ and the second output end $V_{PN}$ of the inverter circuit 10. The greater the phase difference, the greater the common-mode voltage variation, which leads to the greater the electromagnetic radiation generated by the circuit. The first adaptive control circuit 20 provided by this embodiment can generate the first phase control signal according to phase misalignment information, i.e., the phase difference, of the first voltage signal U1 and the second voltage signal U2. The first phase control signal is equivalent to a signal generated by adding delay or lead time to the first oscillation signal, where a magnitude of delay or ahead time is determined by a magnitude of the phase difference between the first voltage signal U1 and the second voltage signal U2. By inputting the first phase control signal into the first driving circuit 40 and adjusting the output of the inverter circuit 10 via the first driving circuit 40 according to the first phase control signal, the phase difference between the first voltage signal U1 and the second voltage signal U2 can be gradually reduced until finally the same, thereby reducing the common-mode voltage variation, for example, reducing the variation to a threshold value. It is worth noting that the phase difference between the first voltage signal U1 and the second voltage signal U2 is less than a preset threshold, such as a first preset threshold, the phases of the first voltage signal U1 and the second voltage signal U2 may be considered to be the same.

The first adaptive control circuit generates a first phase control signal according to the phase difference between the first voltage signal and the second voltage signal, so that the first driving circuit adjusts the output of the inverter circuit according to the first phase control signal, and finally the phases of the first voltage signal and the second voltage signal are the same. The first adaptive control circuit adjusts the output of the inverter circuit, such that the phases of the first voltage signal and the second voltage signal are the same, thereby reducing the magnitude of the common-mode voltage variation and further reducing the electromagnetic emissions of the control circuit. In addition, the first adaptive control circuit detects and corrects the first voltage signal and the second voltage signal in the above manner, which is not affected by the process, voltage and temperature (PVT), has strong robustness and stability, and ensures the conversion efficiency of the full-bridge circuit while reducing the electromagnetic radiation of the control circuit.

Continuing to refer to FIG. 1, in some examples, the inverter circuit 10 includes a first transistor $M_{P1}$, a second transistor $M_{N1}$ a third transistor $M_{P2}$, and a fourth transistor $M_{N2}$. A first electrode of the first transistor $M_{P1}$ is electrically connected with a DC power supply VDD, a second electrode of the first transistor $M_{P1}$ is 1 is electrically connected with a first electrode of the second transistor $M_{N1}$, and the second electrode of the first transistor $M_{P1}$ serves as the first output end $V_{PP}$ of the inverter circuit 10. A second electrode of the second transistor $M_{N1}$ is connected to ground GND1. A first electrode of the third transistor $M_{P2}$ is electrically connected with the first electrode of the first transistor $M_{P1}$, a second electrode of the third transistor $M_{P2}$ is electrically connected with a first electrode of the fourth transistor $M_{N2}$, and the second electrode of the third transistor $M_{P2}$ serves as the second output end $V_{PN}$ of the inverter circuit 10. A second electrode of the fourth transistor $M_{N2}$ is connected to ground GND1. The control end of the inverter circuit 10 includes a first control end G1, a second control end G2, a third control end G3, and a fourth control end G4. A third electrode of the first transistor $M_{P1}$ serves as the first control end G1, a third electrode of the second transistor $M_{N1}$ serves as the second control end G2, a third electrode of the third transistor $M_{P2}$ serves as the third control end G3, and a third electrode of the fourth transistor $M_{N2}$ serves as the fourth control end G4. The third electrodes of these four transistors can be gates.

The output end of the first driving circuit 40 includes a first driving output end, a second driving output end, a third driving output end and a fourth driving output end. The first driving output end is electrically connected with the first control end G1 of the inverter circuit 10, the second driving output end is electrically connected with the second control end G2 of the inverter circuit 10, the third driving output end is electrically connected with the third control end G3 of the inverter circuit 10, and the fourth driving output end is electrically connected with the fourth control end G4 of the inverter circuit 10.

The first transistor $M_{P1}$, the second transistor $M_{N1}$, the third transistor $M_{P2}$ and the fourth transistor $M_{N2}$ may be field effect transistors, such as metal oxide semiconductor field effect transistors (MOSFETs), abbreviated as MOS tubes, or may be bipolar junction transistors, which are not specifically limited in this embodiment. As exemplarily shown in this embodiment, the first transistor $M_{P1}$ and the third transistor $M_{P2}$ are both P-channel Metal Oxide Semiconductor (PMOS) transistors, while the second transistor $M_{N1}$ and the fourth transistor $M_{N2}$ are both N-channel Metal Oxide-Semiconductor (NMOS) transistors. The first transistor $M_{P1}$ and the fourth transistor $M_{N2}$ may be regarded as a pair of transistors, and the second transistor $M_{N1}$ and the third transistor $M_{P2}$ may be regarded as a pair of transistors. In the operation of the inverter circuit 10, two pairs of transistors are controlled to be turned on alternately, that is, the first transistor $M_{P1}$ and the fourth transistor $M_{N2}$ need to be controlled to be turned on or off at the same time, and the second transistor $M_{N1}$ and the third transistor $M_{P2}$ need to be turned on or off at the same time. However, a certain factor may cause two transistors in a pair of transistors unable to be turned on or off synchronously although signals are applied to the control ends at the same time. In some examples, the fourth transistor $M_{N2}$ is turned off before the first transistor $M_{P1}$, and at this time, the phase of the second voltage signal U2 is ahead of the phase of the first voltage signal U1. The first adaptive control circuit 20 generates the first phase control signal according to the phase difference between the second voltage signal U2 and the first voltage signal U1, and after passing through the first driving circuit 40, it generates a pair of signals with different time delays and outputs them to the first control end G1 and the fourth control end G4 of the inverter circuit 10. In some examples, the fourth transistor $M_{N2}$ may receive a turn-off signal later than the first transistor $M_{P1}$, and finally the first transistor $M_{P1}$ and the fourth transistor $M_{N2}$ operate synchronously through multiple adjustments. It is worth noting that the four output ends of the first driving circuit 40 are not shown in FIG. 1, but are shown in the following FIG. 2.

In this embodiment, it is exemplarily shown that the inverter circuit includes four transistors, the second electrode of the first transistor $M_{P1}$ serves as the first output end $V_{PP}$ of the inverter circuit 10 for outputting a first voltage signal U1, and the second electrode of the third transistor $M_{P2}$ serves as the second output end $V_{PN}$ of the inverter circuit 10 for outputting a second voltage signal U2. In other embodiments, the third electrode of the first transistor $M_{P1}$ may serve as the first output end $V_{PP}$ of the inverter circuit 10 for outputting a first voltage signal U1, and the third electrode of the fourth transistor $M_{N2}$ serves as the second output end $V_{PN}$ of the inverter circuit 10 for outputting a second voltage signal U2. In this case, the third electrode of the first transistor $M_{P1}$ can adjust the first voltage signal U1, and the third electrode of the fourth transistor $M_{N2}$ can adjust the second voltage signal U2. Or, the inverter circuit 10 further includes a first resistor voltage dividing unit and a second resistor voltage dividing unit, where the first resistor voltage dividing unit includes a first resistor and a second resistor, and the second resistor voltage dividing unit includes a third resistor and a fourth resistor. The second electrode of the first transistor $M_{P1}$ is connected with a first side of the first resistor, a second side of the first resistor is electrically connected with a first side of the second resistor, and a second side of the second resistor is grounded. The second side of the first resistor serves as the first output end $V_{PP}$ of the inverter circuit 10 for outputting the first voltage signal U1. Similarly, a first side of the third resistor is electrically connected with the second electrode of the third transistor $M_{P2}$, a second side of the third resistor is electrically connected with a first side of the fourth resistor, and a second side of the fourth resistor is grounded. The second side of the third resistor serves as the second output end $V_{PN}$ of the inverter circuit 10 for outputting the second voltage signal U2, i.e., the first voltage signal U1 and the second voltage signal U2 outputted by the inverter circuit 10 are voltages divided by the resistors, and the voltage value is small, so as to avoid damaging components in the first adaptive control circuit 20 due to excessive voltage. Or, the inverter circuit 10 further includes a first capacitor voltage dividing unit and a second capacitor voltage dividing unit, a structure and connection relationship of the first capacitor voltage dividing unit are similar to those of the first resistor voltage dividing unit, and a structure and connection relationship of the second capacitor voltage dividing unit are similar to those of the second resistor voltage dividing unit, except that the first capacitor voltage dividing unit and the second capacitor voltage dividing unit divide voltages by capacitors. In this embodiment, only one specific structure of resistor voltage dividing or capacitor voltage dividing is shown by way of example. In other embodiments, resistor voltage dividing or capacitor voltage dividing can also be other voltage dividing structures, which are not specifically limited.

Figure 2:
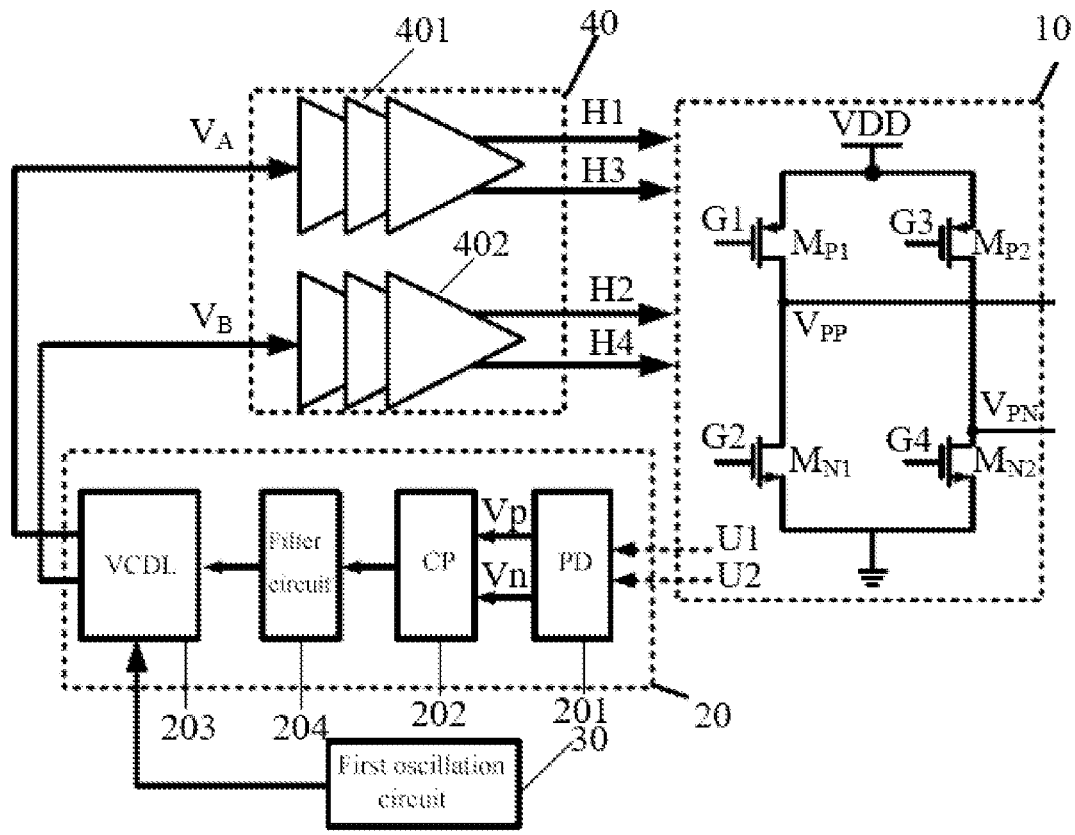
FIG. 2 is a schematic structural diagram of another control circuit for reducing electromagnetic radiation according to an embodiment of the present disclosure.

FIG. 2 is a schematic structural diagram of another control circuit for reducing electromagnetic radiation according to an embodiment of the present disclosure. Referring to FIG. 2, in some examples, the first phase control signal includes a first control signal $V_A$ and a second control signal $V_B$, an output end of the first adaptive control circuit 20 includes a first output end and a second output end, the first output end of the first adaptive control circuit 20 is configured to output the first control signal $V_A$ and the second output end of the first adaptive control circuit 20 is configured to output the second control signal $V_B$.

The first driving circuit 40 includes a first driving module 401 and a second driving module 402. A first output end of the first driving module 401 serves as a first driving output end H1, a second output end of the first driving module 401 serves as a third driving output end H3, a first output end of the second driving module 402 serves as a second driving output end H2, and a second output end of the second driving module 402 serves as a fourth driving output end H4. An input end of the first driving module 401 couples to the first control signal $V_A$, and an input end of the second driving module 402 couples to the second control signal $V_B$.

The first output end of the first driving module 401, serving as the first driving output end H1, is electrically connected with the first control end G1 of the inverter circuit 10 for controlling turn-on and turn-off of the first transistor $M_{P1}$. The second output end of the first driving module 401, serving as the third driving output end H3, is electrically connected with the third control end G3 of the inverter circuit 10 for controlling turn-on and turn-off of the third transistor $M_{P2}$. The first output end of the second driving module 402, serving as the second driving output end H2, is electrically connected with the second control end G2 of the inverter circuit 10 for controlling turn-on and turn-off of the second transistor $M_{N1}$. The second output end of the second driving module 402, serving as the fourth driving output end H4, is electrically connected with the fourth control end G4 of the inverter circuit 10 for controlling turn-on and turn-off of the fourth transistor $M_{N2}$.

The first adaptive control circuit 20 generates and outputs a pair of first control signal $V_A$ and second control signal $V_B$ having a delay difference by processing the input first oscillation signal according to the phase misalignment information of the first voltage signal U1 and the second voltage signal U2. The first control signal $V_A$ and the second control signal $V_B$ are input into the first driving module 401 and the second driving module 402 of the first driving circuit 40, respectively, to generate four power level driving signals, which are respectively output to the third electrode of the corresponding transistor through four driving output ends, so as to adjust the turn-on or turn-off sequences of the switching tubes. Phases of the signals output by the first driving output end H1 and the third driving output end H3 are opposite, and phases of the signals output by the second driving output end H2 and the fourth driving output end H4 are opposite. It is exemplarily shown in this embodiment that a transistor connected to the first driving output H1 and a transistor connected to the third driving output H3 are P-type transistors, and a transistor connected to the second driving output H2 and a transistor connected to the fourth driving output H4 are N-type transistors.

In this embodiment, taking the first transistor $M_{P1}$ and the third transistor $M_{P2}$ as PMOS transistors and taking the second transistor $M_{N1}$ and the fourth transistor $M_{N2}$ as NMOS transistors as an example. In other embodiments, the first transistor $M_{P1}$ and the third transistor $M_{P2}$ can be set as N-type transistors, and the second transistor $M_{N1}$ and the fourth transistor $M_{N2}$ can be set as P-type transistors, or the types of the first transistor $M_{P1}$, the second transistor $M_{N1}$, the third transistor $M_{P2}$ and the fourth transistor $M_{N2}$ are all the same, which is not specifically limited by this embodiment.

Continuing to refer to FIG. 2, in some examples, the first adaptive control circuit includes a phase detector (PD) 201, a charge pump (CP) 202 and a voltage control delay line (VCDL) 203. A first input end of the phase detector 201 couples to the first voltage signal U1, a second input end of the phase detector 201 couples to the second voltage signal U2, and the phase detector 201 is configured to generate a first timing control signal Vp and a second timing control signal Vn according to the phase difference between the first voltage signal U1 and the second voltage signal U2.

A first input end of the charge pump 202 couples to the first timing control signal Vp, a second input end of the charge pump 202 couples to the second timing control signal Vn, and the charge pump 202 is configured to generate a voltage-controlled control voltage according to the first timing control signal Vp and the second timing control signal Vn.

An input end of the voltage control delay line 203 is electrically coupled to an output end of the charge pump 202, the input end of the voltage control delay line 203 is further electrically connected with the output end of the first oscillation circuit 30, a first output end of the voltage control delay line 203 serves as the first output end of the first adaptive control circuit 20, a second output end of the voltage control delay line 203 serves as the second output end of the first adaptive control circuit 20, and the voltage control delay line 203 is configured to generate the first phase control signal according to the voltage-controlled control voltage and the first oscillation signal. Specifically, the voltage control delay line 203 receives the first oscillation signal and the voltage-controlled control voltage, controls a current of the voltage control delay line 203 through the received voltage-controlled control voltage, thereby changing delay time of a delay stage in the voltage control delay line 203 through a change of the current, and applies/adds the delay time to the first oscillation signal to generate the first phase control signal.

The phase detector 201 is configured to convert phase difference information of the first voltage signal U1 and the second voltage signal U2 into voltage signals, namely the first timing control signal Vp and the second timing control signal Vn. The charge pump controls a magnitude of the voltage-controlled control voltage input into the voltage control delay line 203 based on the first timing control signal Vp and the second timing control signal Vn. The voltage control delay line 203 is configured to process the input first oscillation signal according to the magnitude of the voltage-controlled control voltage and output a pair of signals with a delay difference, i.e., the first control signal $V_A$ and the second control signal $V_B$. The magnitude of the delay difference between the first control signal $V_A$ and the second control signal $V_B$ is determined by the magnitude of the voltage-controlled control voltage. It is worth noting that the first output of the voltage control delay line 203 serves as the first output of the first adaptive control circuit 20 for outputting the first control signal $V_A$, and the second output of the voltage control delay line 203 serves as the second output of the first adaptive control circuit 20 for outputting the second control signal $V_B$.

Continuing to refer to FIG. 2, in some examples, the first adaptive control circuit 20 further includes a filter circuit 204, an input end of the filtering circuit 204 is electrically connected with an output end of the charge pump 202, and an output end of the filtering circuit 204 is electrically connected with the input end of the voltage control delay line 203. The filter circuit 204 is configured to filter a signal output from the charge pump 202 to improve the reliability of signal transmission.

Figure 3:
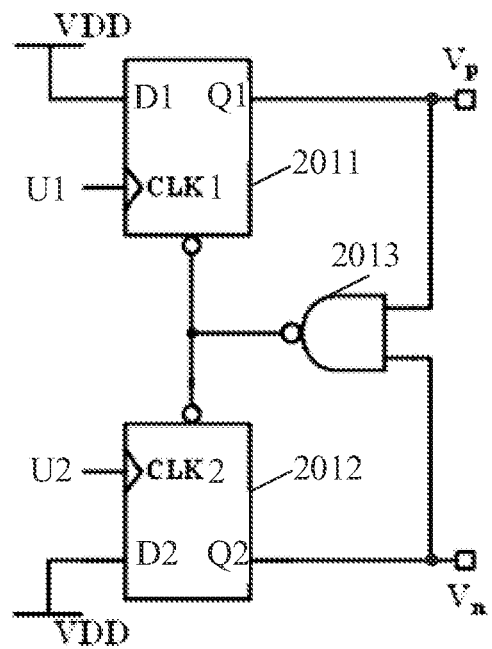
FIG. 3 is a schematic structural diagram of a phase detector according to an embodiment of the present disclosure.
Figure 4:
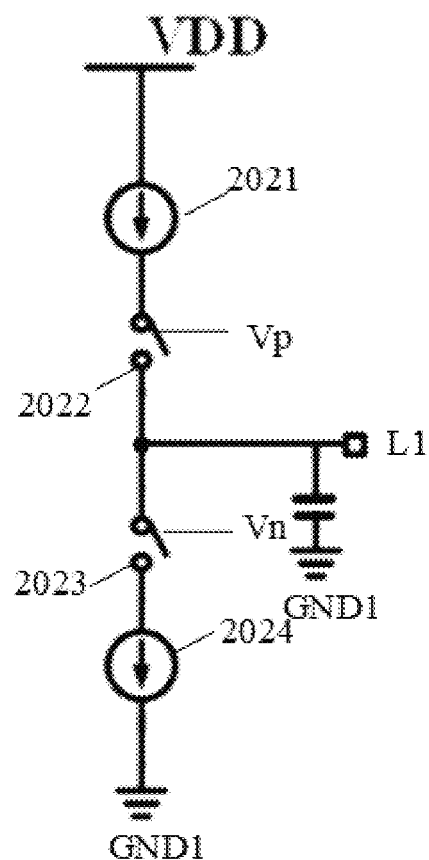
FIG. 4 is a schematic structural diagram of a charge pump according to an embodiment of the present disclosure.

As an embodiment, this embodiment provides a specific structure of a phase detector and a charge pump. FIG. 3 is a schematic structural diagram of a phase detector according to an embodiment of the present disclosure, and FIG. 4 is a schematic structural diagram of a charge pump according to an embodiment of the present disclosure. Referring to FIG. 2, FIG. 3 and FIG. 4, and in some examples, the phase detector includes a first flip-flop 2011, a second flip-flop 2012, and a not AND (NAND) gate 2013. The first flip-flop 2011 and the second flip-flop 2012 have a same structure, an input end D1 of the first flip-flop 2011 and an input end D2 of the second flip-flop 2012 are both electrically connected with the DC power source VDD. A clock end CLK1 of the first flip-flop 2011 serves as the first input of the phase detector to connect with the first voltage signal U1, and a clock end CLK2 of the second flip-flop 2012 serves as the second input of the phase detector to connect with the second voltage signal U2. An output end Q1 of the first flip-flop 2011 is configured to output the first timing control signal Vp, and an output end Q2 of the second flip-flop 2012 is configured to output the second timing control signal Vn. At the same time, the output end Q1 of the first flip-flop 2011 and the output end Q2 of the second flip-flop 2012 serve as the two input ends of the NAND gate 2013. The output end of the NAND gate 2013 is connected to a reset end of the first flip-flop 2011 and a reset end of the second flip-flop 2012. The charge pump includes a first power supply 2021, a first switch 2022, a second switch 2023 and a second power supply 2024, and the first power supply 2021, the first switch 2022, the second switch 2023 and the second power supply 2024 are sequentially connected in series between the DC power supply VDD and the ground GND1. A control end of the first switch 2022 connects with the first timing control signal Vp, and a control end of the second switch 2023 connects with the second timing control signal Vn. In some examples, the charge pump further includes a storage capacitor, a first side of the storage capacitor is electrically connected with a common end L1 of the first switch 2022 and the second switch 2023, and a second side of the storage capacitor is connected to the ground GND1. The common end L1 of the first switch 2022 and the second switch 2023 serves as the output end of the charge pump and may be connected with the filter circuit 204. The filter circuit 204 includes a capacitor.

When differential signals, i.e., the first voltage signal U1 and the second voltage signal U2, arrive successively, outputs of the first flip-flop 2011 and the second flip-flop 2012 will be set to a high voltage level successively. When they are both at a high voltage level (corresponding to the time when a pair of transistors are turned on or off), reset signals generated by outputs of the NAND gate 2013 will be input to the first flip-flop 2011 and the second flip-flop 2012, respectively, so as to set 0 to the signal outputted by the output end Q1 of the first flip-flop 2011 and the signal outputted by the output end Q2 of the second flip-flop 2012. Through the above process, when the phases of U1 and U2 are different, the phase detector 201 generates and outputs a pair of pulse signals with different pulse widths according to the first voltage signal U1 and the second voltage signal U2, i.e., the first timing control signal Vp and the second timing control signal Vn, and then the phase detector completes a phase comparison of the first voltage signal U1 and the second voltage signal U2. When the first timing control signal Vp or the second timing control signal Vn is at a first voltage level, such as a high voltage level, the first switch 2022 or the second switch 2023 is correspondingly controlled to be closed, so that capacitors of the storage capacitor can be charged or discharged. When the first timing control signal Vp or the second timing control signal Vn is at a second voltage level, such as a low voltage level, the first switch 2022 or the second switch 2023 is correspondingly controlled to be opened, thereby changing a magnitude of a voltage on the capacitors, i.e., the voltage-controlled control voltage. Specifically, when the first timing control signal Vp is at a high voltage level and the second timing control signal Vn is at a low voltage level, or when the first timing control signal Vp is at a low voltage level and the second timing control signal Vn is at a high voltage level, the voltage on the capacitors remains unchanged. When the first timing control signal Vp is at a low voltage level and the second timing control signal Vn is at a low voltage level, the voltage on the capacitors rises. When the first timing control signal Vp is at a high voltage level and the second timing control signal Vn is at a high voltage level, the voltage on the capacitors decreases.

Figure 5:
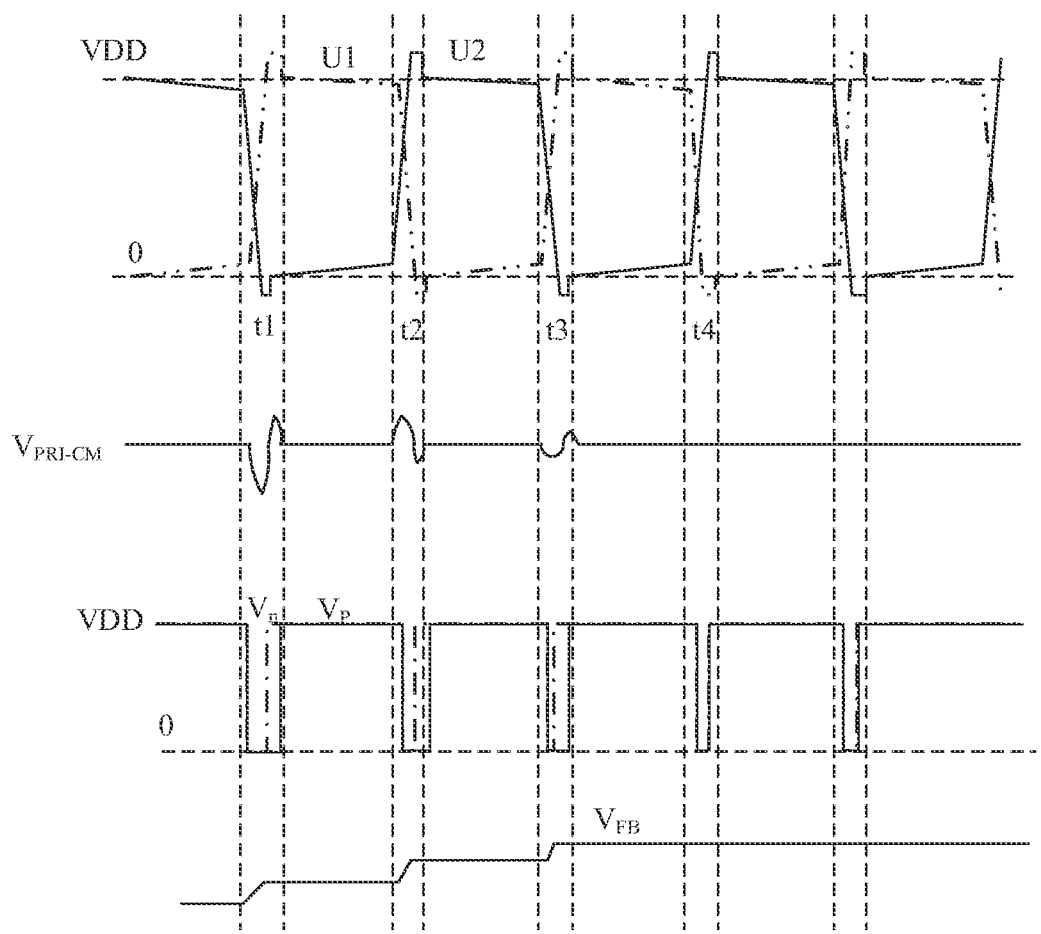
FIG. 5 is an operation waveform diagram of an inverter circuit according to an embodiment of the present disclosure.

This embodiment exemplarily shows a process in which the first adaptive control circuit 20 adjusts the phases of the first voltage signal U1 and the second voltage signal U2, and takes response of the fourth transistor $M_{N2}$ faster than that of the first transistor $M_{P1}$ and response of the second transistor $M_{N1}$ faster than that of the third transistor $M_{P2}$ as an example. FIG. 5 is an operation waveform diagram of an inverter circuit according to an embodiment of the present disclosure. Referring to FIGS. 2 and 5, an adjustment process of the inverter circuit includes four stages.

First time period t1: the fourth transistor $M_{N2}$ is turned off before the first transistor $M_{P1}$, an impedance of the fourth transistor $M_{N2}$ increases faster, a common-mode voltage $V_{PRI-CM}$ is lower than Vd/2 and appears to change more dramatically, and then the second transistor $M_{N1}$ is turned on before the third transistor $M_{P2}$, an impedance of the second transistor $M_{N1}$ decreases faster, and the common-mode voltage $V_{PRI-CM}$ is higher than Vd/2 and appears to change more dramatically. During this period, the phase detector 201 samples the phase misalignment information of the first voltage signal U1 and the second voltage signal U2, and outputs the first timing control signal Vp and the second timing control signal Vn reflecting the phase difference, so that the charge pump 202 performs charging operation and a voltage-controlled control voltage $V_{FB}$ increases. The voltage control delay line 203 delays the first oscillation signal according to $V_{FB}$, so that a low voltage level generated by the second driving output end H2 acting on the second transistor $M_{N1}$ is later than a high voltage level generated by the third driving output end H3 acting on the third transistor $M_{P2}$ in the next stage.

Second time period t2: at this stage, although the second transistor $M_{N1}$ is still turned off before the third transistor $M_{P2}$, due to adding a delay to the signal received by a third electrode of the second transistor $M_{N1}$ after the end of the first time period t1, the time for the second transistor $M_{N1}$ to turn off before the third transistor $M_{P2}$ is reduced, and an amplitude of the common-mode voltage $V_{PRI-CM}$ decreases, and subsequently, the fourth transistor $M_{N2}$ turned on earlier than the first transistor $M_{P1}$ also exhibited a common-mode voltage $V_{PRI-CM}$ smaller than that in t1. The first adaptive control circuit 20 continues to sample, the voltage-controlled control voltage $V_{FB}$ increases, and the delay continues to be added.

Third time period t3: the fourth transistor $M_{N2}$ continues to be increased the delay and the amplitude of the common-mode voltage $V_{PRI-CM}$ continues to decrease, and then the second transistor $M_{N1}$ turned on before the third transistor $M_{P2}$ also exhibits a common-mode voltage $V_{PRI-CM}$ smaller than that in t2. The first adaptive control circuit 20 continues to sample, the voltage-controlled control voltage $V_{FB}$ increases, and the delay continues to be added.

Fourth time period t4: before the fourth time period t4, the first adaptive control circuit 20 has completed a detection of the phase misalignment information of the first voltage signal U1 and the second voltage signal U2 and has provided a corresponding delay, the second transistor $M_{N1}$ and the third transistor $M_{P2}$ are simultaneously turned off, and subsequently, the fourth transistor $M_{N2}$ and the first transistor MP1 are turned on synchronously, so the common-mode voltage $V_{PRI-CM}$ is approximately stable at Vd/2, and the voltage-controlled control voltage $V_{FB}$ remains stable. The first adaptive control circuit 20 maintains the current delay unchanged, and the feedback adjustment process is completed.

Both the first oscillation circuit 30 and the first driving circuit 40 in the above embodiment can adopt the existing circuits in the prior art, and this embodiment is not specifically limited to this. The structures of the phase detector in FIG. 3 and the charge pump in FIG. 4 are both exemplary optional structures, and in other embodiments, any existing structure of the phase detector that can realize phase comparison can be selected, which is not specifically limited in this embodiment.

Continuing to refer to FIG. 2, since the inverter circuit 10 is a full-bridge driving circuit with a symmetrical structure, normally, the second transistor $M_{N1}$ and the fourth transistor $M_{N2}$ are manufactured with the same process, and the first transistor $M_{P1}$ and the third transistor $M_{P2}$ are manufactured with the same process, and thus, the second transistor $M_{N1}$ and the fourth transistor $M_{N2}$ have a same response speed, and the first transistor $M_{P1}$ and the third transistor $M_{P2}$ have a same response speed. That is, if the response speed of the fourth transistor $M_{N2}$ is faster than that of the first transistor $M_{P1}$, the response speed of the second transistor $M_{N1}$ is also faster than that of the third transistor $M_{P2}$. The asynchronous operation of transistors in the inverter circuit 10 can be adjusted by the first adaptive control circuit 20. If a special case occurs, the response speeds of the second transistor $M_{N1}$ and the fourth transistor $M_{N2}$ are not the same, or the response speeds of the first transistor $M_{P1}$ and the third transistor $M_{P2}$ are different. In some examples, the response speed of the fourth transistor $M_{N2}$ is faster than the response speed of the first transistor $M_{P1}$, while the response speed of the third transistor $M_{P2}$ is faster than the response speed of the second transistor $M_{N1}$. At this time, a third adaptive control circuit and a third driving circuit can further be set, so that the first driving circuit 40 is configured to adjust the response speeds of the fourth transistor $M_{N2}$ and the first transistor $M_{P1}$ according to the first control signal and second control signal, and the third driving circuit is configured to adjust the response speeds of the third transistor $M_{P2}$ and the second transistor $M_{N1}$ according to a fifth control signal and a sixth control signal output by the third adaptive control circuit. A connection relationship between the third adaptive control circuit and the third driving circuit can refer to the connection relationship between the first adaptive control circuit and the first driving circuit, and will not be described here. It is worth noting that when the control circuit for reducing electromagnetic radiation includes the third adaptive control circuit and the third driving circuit, the first driving circuit includes two signal output ends, which are respectively configured to control the turn-on and turn-off of a pair of transistors in the inverter circuit 10, and the third driving circuit includes two signal output ends, which are respectively configured to control the turn-on and turn-off of another pair of transistors in the inverter circuit 10.

Figure 6:
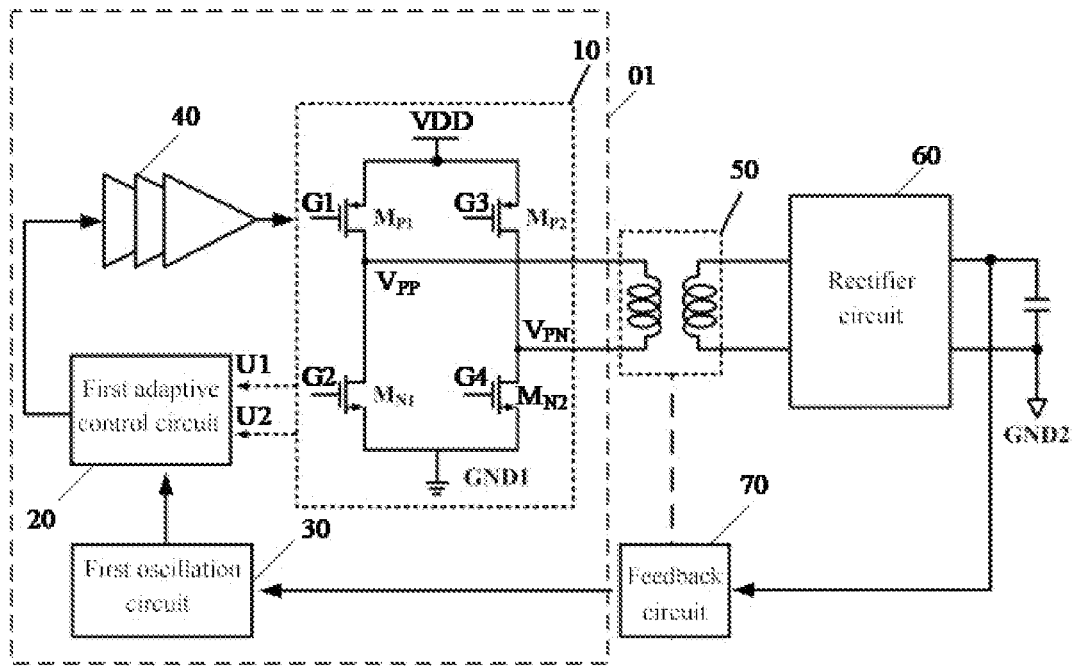
FIG. 6 is a schematic structural diagram of an isolated power supply system according to an embodiment of the present disclosure.

Embodiments of the present disclosure further provides an isolated power supply system. FIG. 6 is a schematic structural diagram of an isolated power supply system according to an embodiment of the present disclosure. Referring to FIG. 6, the isolated power supply system includes a transformer 50, a rectifier circuit 60 and the control circuit for reducing electromagnetic radiation 01 in the above embodiment. A first input end of the transformer 50 is coupled to the first voltage signal U1, and a second input end of the transformer 50 is coupled to the second voltage signal U2, and an output end of the transformer 50 is electrically connected with an input end of the rectifier circuit 60, and an output end of the rectifier circuit 60 is electrically connected with a load.

The first input end of the transformer 50 couples to the first voltage signal U1, that is, the first input end of the transformer 50 is electrically connected with the first output end $V_{PP}$ of the inverter circuit 10, and the second input end of the transformer 50 couples to the second voltage signal U2, that is, the second input end of the transformer 50 is electrically connected with the second output end $V_{PN}$ of the inverter circuit 10. A voltage of DC power supply VDD is converted into an AC voltage by the inverter circuit 10 and transmitted to the rectifier circuit 60 through the transformer 50. The rectifier circuit 60 converts the AC voltage into a DC voltage and supplies it to the load. Power transmission between high voltage side and low voltage side is realized through the transformer 50, which is beneficial to ensuring the safety and reliability of the system. It is worth noting that ground GND2 connected to the output end of the rectifier circuit 60 is different from the ground GND1 connected to the transistors in the inverter circuit 10.

The beneficial effects possessed by the isolated power supply system in this embodiment are the same as the beneficial effects possessed by the control circuit for reducing electromagnetic radiation 01, and will not be repeated herein.

Continuing to refer to FIG. 6, in some examples, the isolated power supply system further includes a feedback circuit 70, where an input end of the feedback circuit 70 is electrically connected with the output end of the rectifier circuit 60, and an output end of the feedback circuit 70 is electrically connected with an input end of the first oscillation circuit 30, and the feedback circuit 70 is configured to control a frequency of the first oscillation signal output by the first oscillation circuit 30 according to a voltage output by the output end of the rectifier circuit 60 and an expected voltage, so that a difference between the voltage output by the output end of the rectifier circuit 60 and the expected voltage is less than a threshold voltage.

In some examples, when the expected voltage is 5 V and the voltage output by the output end of the rectifier circuit 60 is 4.5 V, the feedback circuit 70 is configured to control the frequency of the first oscillation signal output by the first oscillation circuit 30 according to the difference between the voltage output by the output end of the rectifier circuit 60 and the expected voltage, so as to increase the voltage output by the output end of the rectifier circuit 60 until the difference between the voltage output by the output end of the rectifier circuit 60 and the expected voltage is less than the threshold voltage. In some examples, the threshold voltage may be 0.1 V. When the difference between the expected voltage and the voltage output by the rectifier circuit 60 is less than 0.1 V, it can be considered that the voltage output by the rectifier circuit 60 is equal to the expected voltage, and the output voltage meets the requirements, so the voltage output by the rectifier circuit 60 will not be adjusted. The feedback circuit can feedback and adjust the voltage output by the rectifier circuit 60, so that the voltage output by the rectifier circuit 60 is equal to the expected voltage required by the load, and the power supply demand of the load can be met.

Figure 7:
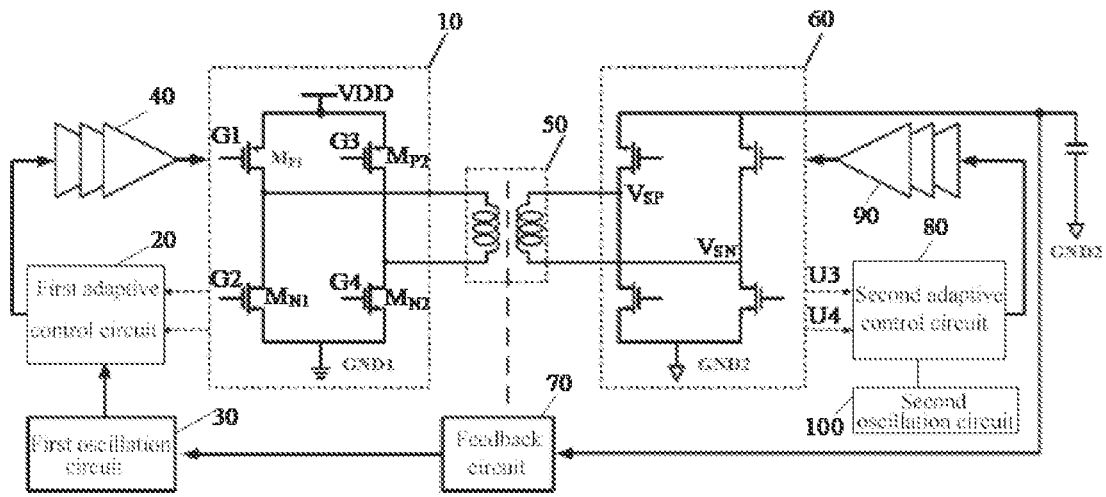
FIG. 7 is a schematic structural diagram of another isolated power supply system according to an embodiment of the present disclosure.

FIG. 7 is a schematic structural diagram of another isolated power supply system according to an embodiment of the present disclosure. Referring to FIG. 7, in some examples, the output end of the transformer includes a first output end and a second output end, the rectifier circuit 60 is a full-bridge rectifier circuit, and the isolated power supply system further includes a second adaptive control circuit 80, a second driving circuit 90 and a second oscillation circuit 100.

A first input end $V_{SP}$ of the rectifier circuit 60 is configured to electrically connected with the first output end of the transformer 50, the first output end of the transformer 50 is configured to output a third voltage signal U3, a second input end $V_{SN}$ of the rectifier circuit 60 is electrically connected with the second output end of the transformer 50, and the second output end of the transformer 50 is configured to output a fourth voltage signal U4.

The second oscillation circuit 100 is configured to generate and output a second oscillation signal.

A first sampling end of the second adaptive control circuit 80 couples to the first voltage signal U3, a second sampling end of the second adaptive control circuit 80 couples to the second voltage signal U4, an input end of the second adaptive control circuit 80 is electrically connected with an output end of the second oscillation circuit 100, and an output end of the second adaptive control circuit 80 is electrically connected with an input end of the second driving circuit 90. The second adaptive control circuit 80 is configured to generate a second phase control signal according to the second oscillation signal and a phase difference between the third voltage signal U3 and the fourth voltage signal U4.

An output end of the second driving circuit 90 is electrically connected with a control end of the inverter circuit 60, and the second driving circuit 90 is configured to adjust an output of the inverter circuit 60 according to the second phase control signal, so that phases of the third voltage signal U3 and the fourth voltage signal U4 are the same. When the phase difference between U3 and U4 is less than a second preset threshold, it can be considered that the phases of U3 and U4 are the same. The first preset threshold and the second preset threshold may be the same or different.

A specific structure of the rectifier circuit is the same as that of the inverter circuit in FIG. 2, and the details of this embodiment are not repeated here. Moreover, operation principles of the second adaptive control circuit 80, the second driving circuit 90 and the second oscillation circuit 100 are the same as operation principles of the first adaptive control circuit 20, the first driving circuit 40 and the first oscillation circuit 30, respectively, which is not specifically limited in this embodiment. When the rectifier circuit 60 is also a bridge circuit, the output of the rectifier circuit 60 can be adjusted by the second adaptive control circuit 80, so that phases of the third voltage signal U3 and the fourth voltage signal U4 are the same, thereby reducing the magnitude of the common-mode voltage variation between the first output end $V_{SP}$ and the second output end $V_{SN}$ of the rectifier circuit 60, and thereby reducing the electromagnetic radiation of the entire isolated power supply system.

Figure 8:
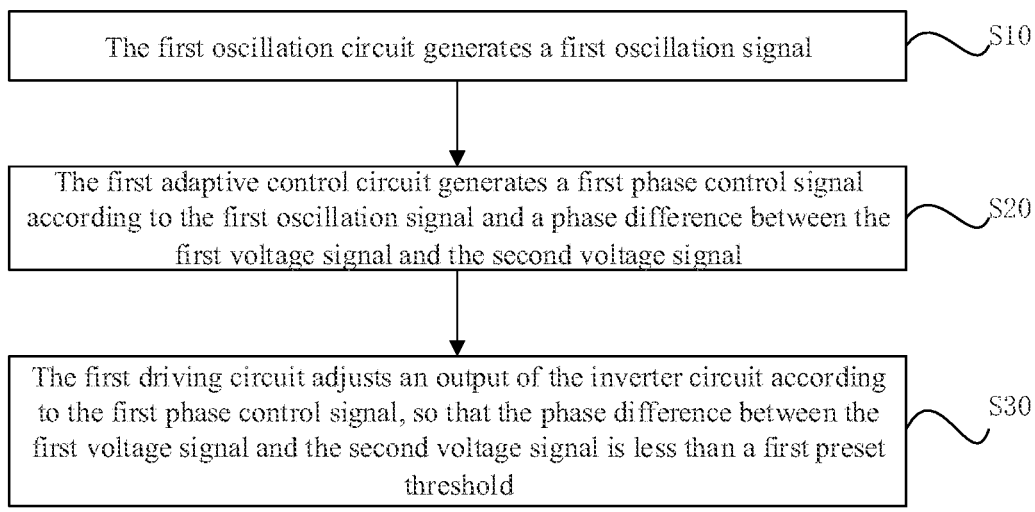
FIG. 8 is a flowchart of a control method of a control circuit for reducing electromagnetic radiation according to an embodiment of the present disclosure.

Embodiments of the present disclosure further provide a control method of a control circuit for reducing electromagnetic radiation. FIG. 8 is a flowchart of a control method of a control circuit for reducing electromagnetic radiation according to an embodiment of the present disclosure. The control circuit for reducing electromagnetic radiation includes: an inverter circuit, a first adaptive control circuit, a first oscillation circuit and a first driving circuit, a first output end of the inverter circuit is configured to output a first voltage signal, and a second output end of the inverter circuit is configured to output a second voltage signal; the first oscillation circuit is configured to generate a first oscillation signal, a first sampling end of the first adaptive control circuit couples to the first voltage signal, a second sampling end of the first adaptive control circuit couples to the second voltage signal, an input end of the first adaptive control circuit is electrically connected with an output end of the first oscillation circuit, an output end of the first adaptive control circuit is electrically connected with an input end of the first driving circuit, and an output end of the first driving circuit is electrically connected with a control end of the inverter circuit;

Referring to FIG. 8, the control method includes:

At step S10: the first oscillation circuit generates a first oscillation signal.

At step S20: the first adaptive control circuit generates a first phase control signal according to the first oscillation signal and a phase difference between the first voltage signal and the second voltage signal.

At step S30: the first driving circuit adjusts an output of the inverter circuit according to the first phase control signal, so that the phase difference between the first voltage signal and the second voltage signal is less than a first preset threshold.

Specifically, when the inverter circuit includes a first transistor, a second transistor, a third transistor and a fourth transistor, where a first electrode of the first transistor is electrically connected with a DC power supply, and a second electrode of the first transistor is electrically connected with a first electrode of the second transistor, and the second electrode of the first transistor serves as the first output end of the inverter circuit, a second electrode of the second transistor is grounded, a first electrode of the third transistor is electrically connected with the first electrode of the first transistor, a second electrode of the third transistor is electrically connected with a first electrode of the fourth transistor, the second electrode of the third transistor serves as the second output end of the inverter circuit, and a second electrode of the fourth transistor is grounded, the control end of the inverter circuit includes a first control end, a second control end, a third control end and a fourth control end, where a third electrode of the first transistor serves as the first control end, a third electrode of the second transistor serves as the second control end, a third electrode of the third transistor serves as the third control end, and a third electrode of the fourth transistor serves as the fourth control end. The third electrodes of these four transistors can be the gates. The output end of the first driving circuit includes a first driving output end, a second driving output end, a third driving output end and a fourth driving output end, where the first driving output end is electrically connected with the first control end of the inverter circuit, the second driving output end is electrically connected with the second control end of the inverter circuit, the third driving output end is electrically connected with the third control end of the inverter circuit, and the fourth driving output end is electrically connected with the inverter circuit.

When a phase of the second voltage signal is ahead of a phase of the first voltage signal, controlling, according to the first phase control signal, a time that the fourth control end of the inverter circuit receives a signal transition edge (rising edge or falling edge) delayed, or a time that the first control end of the inverter circuit receives the signal transition edge advanced. As an example, the present disclosure adds delay or advance processing at the turn-off moment of the transistor, so for an NMOS transistor, it turns off at a low voltage level, the signal transition edge is the falling edge, while for a PMOS transistor, it turns off at a high voltage level, the signal transition edge is the rising edge.

For details, please refer to FIG. 1. For example, when the fourth transistor $M_{N2}$ is turned off before the first transistor $M_{P1}$, the delay control of the first adaptive control circuit can delay the time at which the third electrode of the fourth transistor $M_{N2}$ receives the signal transition edge (turn-off signal) at the next turn-off time, while the time at which the third electrode of the first transistor $M_{P1}$ receives the signal transition edge (turn-off signal) can be advanced or kept unchanged. Or, the time at which the third electrode of the first transistor $M_{P1}$ receives the signal transition edge is advanced, and the time at which the third electrode of the fourth transistor $M_{N2}$ receives the signal transition edge is unchanged or delayed.

When a phase of the second voltage signal is ahead of a phase of the first voltage signal, according to the first phase control signal, a time that the second control end of the inverter circuit receives a signal transition edge is controlled to be delayed, or a time that the third control end of the inverter circuit receives the signal transition edge is controlled to be advanced.

When a phase of the second voltage signal is behind a phase of the first voltage signal, according to the first phase control signal, a time that the fourth control end of the inverter circuit receives a signal transition edge is controlled to be advanced, or a time that the first control end of the inverter circuit receives the signal transition edge is controlled to be delayed.

When a phase of the second voltage signal is behind a phase of the first voltage signal, according to the first phase control signal, a time that the second control end of the inverter circuit receives a signal transition edge is controlled to be advanced, or a time that the third control end of the inverter circuit receives the signal transition edge is controlled to be delayed.

The control method of the control circuit for reducing electromagnetic radiation provided by the embodiment of the present disclosure has the same beneficial effects as those of the control circuit for reducing electromagnetic radiation, and the details of this embodiment are not repeated here.

It should be understood that steps can be reordered, added or deleted using the various forms of process shown above. For example, the steps described in the present disclosure can be executed in parallel, sequentially or in different orders, so long as the desired results of the technical solution disclosed in the present disclosure can be achieved, and are not limited herein.

The above specific embodiments do not constitute a limitation on the scope of protection of the present disclosure. Those skilled in the art should understand that various modifications, combinations, sub combinations and substitutions can be made according to design requirements and other factors. Any modification, equivalent substitution and improvement made within the spirit and principles of the present disclosure should be included in the protection scope of the present disclosure.

The invention claimed is:

1. A control circuit for reducing electromagnetic radiation, comprising: an inverter circuit, a first adaptive control circuit, a first oscillation circuit and a first driving circuit; wherein
a first output end of the inverter circuit is configured to output a first voltage signal, and a second output end of the inverter circuit is configured to output a second voltage signal;
the first oscillation circuit is configured to generate and output a first oscillation signal;

a first sampling end of the first adaptive control circuit couples to the first voltage signal, a second sampling end of the first adaptive control circuit couples to the second voltage signal, an input end of the first adaptive control circuit is electrically connected with an output end of the first oscillation circuit, and an output end of the first adaptive control circuit is electrically connected with an input end of the first driving circuit, and the first adaptive control circuit is configured to generate a first phase control signal according to the first oscillation signal and a phase difference between the first voltage signal and the second voltage signal; and an output end of the first driving circuit is electrically connected with a control end of the inverter circuit, and the first driving circuit is configured to adjust an output of the inverter circuit according to the first phase control signal, so that the phase difference between the first voltage signal and the second voltage signal is less than a first preset threshold;

wherein the inverter circuit comprises a first transistor, a second transistor, a third transistor and a fourth transistor, wherein a first electrode of the first transistor is electrically connected with a direct current (DC) power supply, and a second electrode of the first transistor is electrically connected with a first electrode of the second transistor, and the second electrode of the first transistor serves as the first output end of the inverter circuit, a second electrode of the second transistor is grounded, a first electrode of the third transistor is electrically connected with the first electrode of the first transistor, a second electrode of the third transistor is electrically connected with a first electrode of the fourth transistor, the second electrode of the third transistor serves as the second output end of the inverter circuit, and a second electrode of the fourth transistor is grounded, the control end of the inverter circuit comprises a first control end, a second control end, a third control end and a fourth control end, wherein a third electrode of the first transistor serves as the first control end, a third electrode of the second transistor serves as the second control end, a third electrode of the third transistor serves as the third control end, and a third electrode of the fourth transistor serves as the fourth control end; and the output end of the first driving circuit comprises a first driving output end, a second driving output end, a third driving output end and a fourth driving output end, wherein the first driving output end is electrically connected with the first control end of the inverter circuit, the second driving output end is electrically connected with the second control end of the inverter circuit, the third driving output end is electrically connected with the third control end of the inverter circuit, and the fourth driving output end is electrically connected with the fourth control end of the inverter circuit;

wherein the first phase control signal comprises a first control signal and a second control signal, the output end of the first adaptive control circuit comprises a first output end and a second output end, the first output end of the first adaptive control circuit is configured to output the first control signal and the second output end of the first adaptive control circuit is configured to output the second control signal; and the first driving circuit comprises a first driving sub-circuit and a second driving sub-circuit, wherein a first output end of the first driving sub-circuit serves as the first driving output end, a second output end of the first driving sub-circuit serves as the third driving output end, a first output end of the second driving sub-circuit serves as the second driving output end, and a second output end of the second driving sub-circuit serves as the fourth driving output end, an input end of the first driving sub-circuit couples to the first control signal, and an input end of the second driving sub-circuit couples to the second control signal.

2. The control circuit for reducing electromagnetic radiation according to claim 1, wherein the first adaptive control circuit comprises a phase detector, a charge pump and a voltage control delay line, a first input end of the phase detector couples to the first voltage signal, a second input end of the phase detector couples to the second voltage signal, and the phase detector is configured to generate a first timing control signal and a second timing control signal according to the phase difference between the first voltage signal and the second voltage signal;

a first input end of the charge pump couples to the first timing control signal, a second input end of the charge pump couples to the second timing control signal, and the charge pump is configured to generate a voltage-controlled control voltage according to the first timing control signal and the second timing control signal; and an input end of the voltage control delay line is electrically connected with an output end of the charge pump, the input end of the voltage control delay line is further electrically connected with the output end of the first oscillation circuit, a first output end of the voltage control delay line serves as a first output end of the first adaptive control circuit, a second output end of the voltage control delay line serves as a second output end of the first adaptive control circuit, and the voltage control delay line is configured to generate the first phase control signal according to the voltage-controlled control voltage and the first oscillation signal.

3. The control circuit for reducing electromagnetic radiation according to claim 2, wherein the phase detector comprises a first flip-flop, a second flip-flop with a same structure as the first flip-flop, and a not AND (NAND) gate;

the first input end of the phase detector is electrically connected with a clock end of the first flip-flop, the second input end of the phase detector is electrically connected with a clock end of the second flip-flop, data input ends of the first and second flip-flops are electrically connected with the direct current (DC) power supply, reset ends of the first and second flip-flops are electrically connected with an output end of the NAND gate, an output end of the first flip-flop outputs the first timing control signal, and an output end of the second flip-flop outputs the second timing control signal; and two input ends of the NAND gate are electrically connected with the first timing control signal and the second timing control signal, respectively.

4. The control circuit for reducing electromagnetic radiation according to claim 2, wherein the charge pump comprises a first power supply, a first switch, a second switch, a second power supply, and a storage capacitor, the first power supply, the first switch, the second switch and the second power supply are sequentially connected in series between the direct current (DC) power supply and a ground;

a control end of the first switch is connected to the first timing control signal, and in a case that the first timing control signal is at a first voltage level, the first switch is closed, and in a case that the first timing control signal is at a second voltage level, the first switch is opened;

a control end of the second switch is connected to the second timing control signal, and in a case that the second timing control signal is at the first voltage level, the second switch is closed, and in a case that the second timing control signal is at the second voltage level, the second switch is opened;

a common end of the first switch and the second switch serves as an output end of the charge pump to output the voltage-controlled control voltage; and a first end of the storage capacitor is connected to the common end, and a second end of the storage capacitor is connected to the ground, and the storage capacitor is charged or discharged according to states of the first switch and the second switch.

5. The control circuit for reducing electromagnetic radiation according to claim 2, wherein the first adaptive control circuit further comprises a filter circuit, an input end of the filtering circuit is electrically connected with the output end of the charge pump, and an output end of the filtering circuit is electrically connected with the input end of the voltage control delay line.

6. An isolated power supply system, comprising a transformer, a rectifier circuit and the control circuit for reducing electromagnetic radiation according to claim 1, wherein a first input end of the transformer couples to the first voltage signal, and a second input end of the transformer couples to the second voltage signal, and an output end of the transformer is electrically connected with an input end of the rectifier circuit, and an output end of the rectifier circuit is electrically connected with a load.

7. The isolated power supply system according to claim 6, further comprising a feedback circuit, wherein an input end of the feedback circuit is electrically connected with the output end of the rectifier circuit, and an output end of the feedback circuit is electrically connected with an input end of the first oscillation circuit, and the feedback circuit is configured to control a frequency of the first oscillation signal output by the first oscillation circuit according to a voltage output by the output end of the rectifier circuit and an expected voltage, so that a difference between the voltage output by the output end of the rectifier circuit and the expected voltage is less than a threshold voltage.

8. The isolated power supply system according to claim 6, wherein the output end of the transformer comprises a first output end and a second output end, the rectifier circuit is a full-bridge rectifier circuit, and the isolated power supply system further comprises a second adaptive control circuit, a second driving circuit and a second oscillation circuit;

a first input end of the rectifier circuit is electrically connected with the first output end of the transformer, the first output end of the transformer is configured to output a third voltage signal, a second input end of the rectifier circuit is electrically connected with the second output end of the transformer, and the second output end of the transformer is configured to output a fourth voltage signal;

the second oscillation circuit is configured to generate and output a second oscillation signal;

a first sampling end of the second adaptive control circuit couples to the third voltage signal, a second sampling end of the second adaptive control circuit couples to the fourth voltage signal, an input end of the second adaptive control circuit is electrically connected with an output end of the second oscillation circuit, and an output end of the second adaptive control circuit is electrically connected with an input end of the second driving circuit, and the second adaptive control circuit is configured to generate a second phase control signal according to the second oscillation signal and a phase difference between the third voltage signal and the fourth voltage signal; and an output end of the second driving circuit is electrically connected with a control end of the rectifier circuit, and the second driving circuit is configured to adjust an output of the rectifier circuit according to the second phase control signal, so that the phase difference between the third voltage signal and the fourth voltage signal is less than a second preset threshold.

9. A control method of a control circuit for reducing electromagnetic radiation, wherein the control circuit for reducing electromagnetic radiation comprises: an inverter circuit, a first adaptive control circuit, a first oscillation circuit and a first driving circuit, a first output end of the inverter circuit is configured to output a first voltage signal, and a second output end of the inverter circuit is configured to output a second voltage signal; the first oscillation circuit is configured to generate and output a first oscillation signal, a first sampling end of the first adaptive control circuit couples to the first voltage signal, a second sampling end of the first adaptive control circuit couples to the second voltage signal, an input end of the first adaptive control circuit is electrically connected with an output end of the first oscillation circuit, an output end of the first adaptive control circuit is electrically connected with an input end of the first driving circuit, and an output end of the first driving circuit is electrically connected with a control end of the inverter circuit;

the control method comprises:

generating, by the first oscillation circuit, the first oscillation signal;

generating, by the first adaptive control circuit, a first phase control signal according to the first oscillation signal and a phase difference between the first voltage signal and the second voltage signal; and adjusting, by the first driving circuit, an output of the inverter circuit according to the first phase control signal, so that the phase difference between the first voltage signal and the second voltage signal is less than a first preset threshold;

wherein the inverter circuit comprises a first transistor, a second transistor, a third transistor and a fourth transistor, wherein a first electrode of the first transistor is electrically connected with a direct current (DC) power supply, and a second electrode of the first transistor is electrically connected with a first electrode of the second transistor, and the second electrode of the first transistor serves as the first output end of the inverter circuit, a second electrode of the second transistor is grounded, a first electrode of the third transistor is electrically connected with the first electrode of the first transistor, a second electrode of the third transistor is electrically connected with a first electrode of the fourth transistor, the second electrode of the third transistor serves as the second output end of the inverter circuit, and a second electrode of the fourth transistor is grounded, the control end of the inverter circuit comprises a first control end, a second control end, a third control end and a fourth control end, wherein a third electrode of the first transistor serves as the first control end, a third electrode of the second transistor serves as the second control end, a third electrode of the third transistor serves as the third control end, and a third electrode of the fourth transistor serves as the fourth control end; the output end of the first driving circuit comprises a first driving output end, a second driving output end, a third driving output end and a fourth driving output end, wherein the first driving output end is electrically connected with the first control end of the inverter circuit, the second driving output end is electrically connected with the second control end of the inverter circuit, the third driving output end is electrically connected with the third control end of the inverter circuit, and the fourth driving output end is electrically connected with the fourth control end of the inverter circuit;

wherein adjusting, by the first driving circuit, the output of the inverter circuit according to the first phase control signal, so that the phase difference between the first voltage signal and the second voltage signal is less than the first preset threshold comprises:

in a case that a phase of the second voltage signal is ahead of a phase of the first voltage signal, controlling, according to the first phase control signal, a time that the fourth control end of the inverter circuit receives a signal transition edge to be delayed, or a time that the first control end of the inverter circuit receives the signal transition edge to be advanced; and in a case that the phase of the second voltage signal is ahead of the phase of the first voltage signal, controlling, according to the first phase control signal, a time that the second control end of the inverter circuit receives the signal transition edge to be delayed, or a time that the third control end of the inverter circuit receives the signal transition edge to be advanced.

10. A control method of a control circuit for reducing electromagnetic radiation, wherein the control circuit for reducing electromagnetic radiation comprises: an inverter circuit, a first adaptive control circuit, a first oscillation circuit and a first driving circuit, a first output end of the inverter circuit is configured to output a first voltage signal, and a second output end of the inverter circuit is configured to output a second voltage signal; the first oscillation circuit is configured to generate and output a first oscillation signal, a first sampling end of the first adaptive control circuit couples to the first voltage signal, a second sampling end of the first adaptive control circuit couples to the second voltage signal, an input end of the first adaptive control circuit is electrically connected with an output end of the first oscillation circuit, an output end of the first adaptive control circuit is electrically connected with an input end of the first driving circuit, and an output end of the first driving circuit is electrically connected with a control end of the inverter circuit;

the control method comprises:

generating, by the first oscillation circuit, the first oscillation signal;

generating, by the first adaptive control circuit, a first phase control signal according to the first oscillation signal and a phase difference between the first voltage signal and the second voltage signal; and adjusting, by the first driving circuit, an output of the inverter circuit according to the first phase control signal, so that the phase difference between the first voltage signal and the second voltage signal is less than a first preset threshold;

wherein the inverter circuit comprises a first transistor, a second transistor, a third transistor and a fourth transistor, wherein a first electrode of the first transistor is electrically connected with a direct current (DC) power supply, and a second electrode of the first transistor is electrically connected with a first electrode of the second transistor, and the second electrode of the first transistor serves as the first output end of the inverter circuit, a second electrode of the second transistor is grounded, a first electrode of the third transistor is electrically connected with the first electrode of the first transistor, a second electrode of the third transistor is electrically connected with a first electrode of the fourth transistor, the second electrode of the third transistor serves as the second output end of the inverter circuit, and a second electrode of the fourth transistor is grounded, the control end of the inverter circuit comprises a first control end, a second control end, a third control end and a fourth control end, wherein a third electrode of the first transistor serves as the first control end, a third electrode of the second transistor serves as the second control end, a third electrode of the third transistor serves as the third control end, and a third electrode of the fourth transistor serves as the fourth control end; the output end of the first driving circuit comprises a first driving output end, a second driving output end, a third driving output end and a fourth driving output end, wherein the first driving output end is electrically connected with the first control end of the inverter circuit, the second driving output end is electrically connected with the second control end of the inverter circuit, the third driving output end is electrically connected with the third control end of the inverter circuit, and the fourth driving output end is electrically connected with the fourth control end of the inverter circuit;

wherein adjusting, by the first driving circuit, the output of the inverter circuit according to the first phase control signal, so that the phase difference between the first voltage signal and the second voltage signal is less than the first preset threshold comprises:

in a case that a phase of the second voltage signal is behind a phase of the first voltage signal, controlling, according to the first phase control signal, a time that the fourth control end of the inverter circuit receives a signal transition edge to be advanced, or a time that the first control end of the inverter circuit receives the signal transition edge to be delayed; and in a case that the phase of the second voltage signal is behind the phase of the first voltage signal, controlling, according to the first phase control signal, a time that the second control end of the inverter circuit receives the signal transition edge to be advanced, or a time that the third control end of the inverter circuit receives the signal transition edge to be delayed.

* * * * *